(12) United States Patent
Kang

(10) Patent No.: US 10,669,003 B2
(45) Date of Patent: Jun. 2, 2020

(54) SHIP HAVING IMPROVED POWER EFFICIENCY

(71) Applicant: SAMSUNG HEAVY INDUSTRIES CO., LTD., Seoul (KR)

(72) Inventor: Yun Tae Kang, Gyeongsangnam-do (KR)

(73) Assignee: SAMSUNG HEAVY INDUSTRIES CO., LTD, Seoul (KR)

( * ) Notice: Subject to any disclaimer, the term of this patent is extended or adjusted under 35 U.S.C. 154(b) by 242 days.

(21) Appl. No.: 15/568,417

(22) PCT Filed: Apr. 20, 2016

(86) PCT No.: PCT/KR2016/004083
§ 371 (c)(1),
(2) Date: Oct. 20, 2017

(87) PCT Pub. No.: WO2016/171453
PCT Pub. Date: Oct. 27, 2016

(65) Prior Publication Data
US 2018/0141633 A1 May 24, 2018

(30) Foreign Application Priority Data

Apr. 23, 2015 (KR) .................. 10-2015-0057110

(51) Int. Cl.
*B63J 3/00* (2006.01)
*B63J 99/00* (2009.01)
(Continued)

(52) U.S. Cl.
CPC ................ *B63J 3/00* (2013.01); *B63J 99/00* (2013.01); *H02J 3/28* (2013.01); *H02J 3/381* (2013.01);
(Continued)

(58) Field of Classification Search
CPC ........ B63J 3/00; B63J 99/00; B63J 2003/002; B63J 2099/006; H02J 3/28; H02J 3/381; Y04S 20/222; Y02B 70/3225
See application file for complete search history.

(56) References Cited

U.S. PATENT DOCUMENTS 9,543,748 B2 * 1/2017 Andersen ................. H02H 7/26
10,199,829 B2 * 2/2019 Luo ........................... H02J 3/32
(Continued)

FOREIGN PATENT DOCUMENTS

CN 203967761 U * 11/2014
EP 2595011 A2 5/2013
(Continued)

OTHER PUBLICATIONS

European Patent Office, European Search Report for Application No. 16783386.2, dated Nov. 29, 2018, total of 10 pages.
(Continued)

*Primary Examiner* — Rachid Bendidi
*Assistant Examiner* — Ashley L Redhead, Jr.
(74) *Attorney, Agent, or Firm* — SoCal IP Law Group LLP; Mark Andrew Goldstein

(57) ABSTRACT

A ship having improved power efficiency is provided. The ship comprises: a power grid; a power cost generator which determines the cost of power; a generator which is connected to the power grid and analyzes the cost of power so as to autonomously determine whether to produce power; an energy storage device which is connected to the power grid and analyzes the cost of power so as to autonomously determine whether to store power; and a load which is connected to the power grid and analyzes the cost of power so as to autonomously determine whether to use power.

14 Claims, 12 Drawing Sheets

(51) Int. Cl.
*H02J 3/28* (2006.01)
*H02J 4/00* (2006.01)
*H02J 3/38* (2006.01)
*B63B 79/00* (2020.01)

(52) U.S. Cl.
CPC ............... *H02J 4/00* (2013.01); *B63B 79/00* (2020.01); *B63J 2003/002* (2013.01); *Y02B 70/3225* (2013.01); *Y04S 20/222* (2013.01)

(56) References Cited

U.S. PATENT DOCUMENTS

| | | | |
|---|---|---|---|
| 2007/0143090 A1 | 6/2007 | Skjetne et al. | |
| 2008/0121162 A1* | 5/2008 | Erstad ................... | B63B 21/507 114/230.12 |
| 2012/0038210 A1 | 2/2012 | Kibbee | |
| 2012/0083939 A1* | 4/2012 | Rognli ..................... | H02J 3/14 700/297 |
| 2013/0056648 A1* | 3/2013 | Fahs, II .................. | C02F 1/30 250/432 R |
| 2013/0147421 A1 | 6/2013 | Shin et al. | |
| 2019/0152575 A1* | 5/2019 | Hartman ................. | B63J 99/00 |

FOREIGN PATENT DOCUMENTS

| | | |
|---|---|---|
| JP | 2008283822 A | 11/2008 |
| KR | 20130066099 A | 6/2013 |
| KR | 20130141766 A | 12/2013 |
| KR | 101472582 B1 | 12/2014 |
| WO | 2009067722 A1 | 5/2009 |
| WO | 2010042659 A1 | 4/2010 |
| WO | 2016171453 A1 | 10/2016 |

OTHER PUBLICATIONS

World Intellectual Property Organization, International Search Report for international application No. PCT/KR2016/004083, dated Jul. 26, 2016, 2 total pages.

Chinese Intellectual Property Office, Office Action for Application No. CN 201680023438.9, dated Oct. 23, 2019, 9 total pages.

* cited by examiner

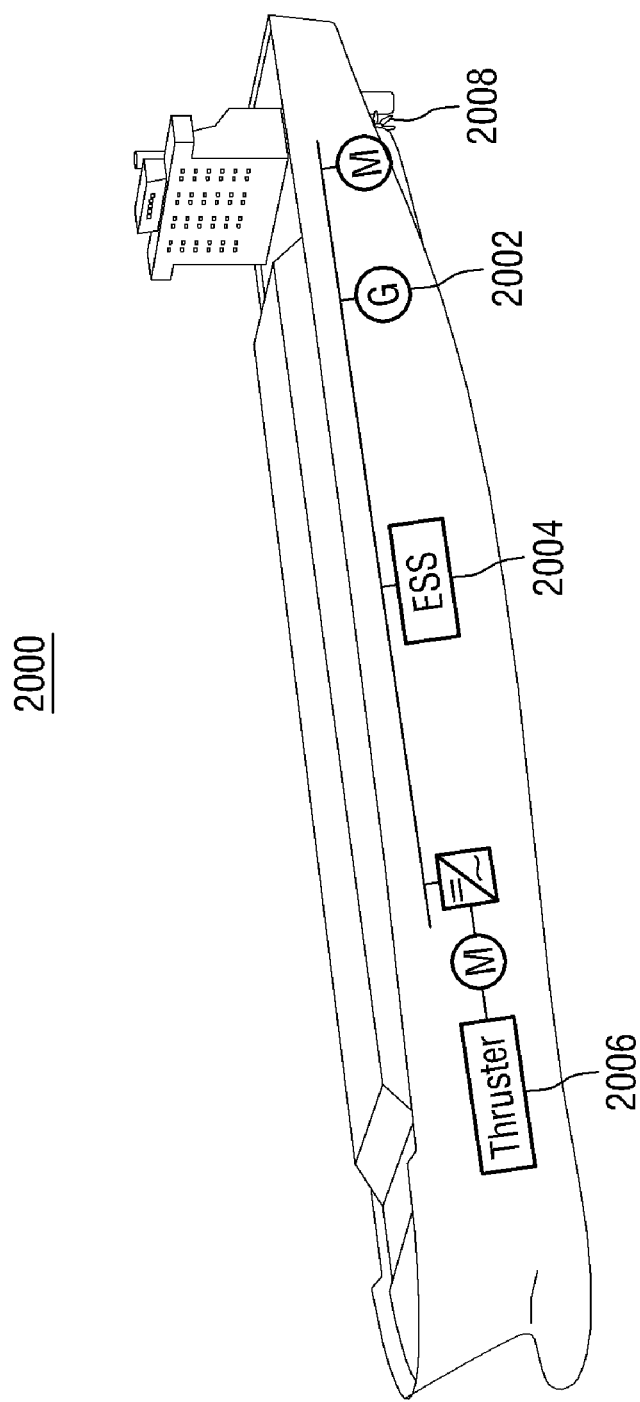

SHIP HAVING IMPROVED POWER EFFICIENCY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/KR2016/004083, filed Apr. 20, 2016 entitled, "SHIP HAVING IMPROVED POWER EFFICIENCY", which claims priority to Korean Patent Application No. 10-2015-0057110, filed Apr. 23, 2015, all of which are incorporated herein by reference in their entirety.

BACKGROUND

Field

The present invention relates to a ship with improved power efficiency.

Description of the Related Art

Rechargeable secondary battery technology has been advancing, and the size of rechargeable secondary batteries relative to their capacity has decreased. Currently, secondary batteries capable of storing and supplying a large amount of electric power are called energy storage systems (ESSs), and attempts have been made to commercialize ESSs as auxiliary power supplies for power operation systems.

DISCLOSURE

Technical Problems

Exemplary embodiments of the present invention provide a ship with improved power efficiency.

Additional advantages, subjects, and features of the present invention will be set forth in part in the description which follows and in part will become apparent to those having ordinary skill in the art upon examination of the following or may be learned from practice of the present invention.

Technical Solutions

According to an aspect of the present invention, a ship includes: a power grid; a power cost generator determining power cost; a generator connected to the power grid, the generator interpreting the power cost and thus determining whether to produce power; an energy storage system (ESS) connected to the power grid, the ESS interpreting the power cost and thus determining whether to store power; and a load connected to the power grid, the load interpreting the power cost and thus determining whether to use power.\

The power cost may be calculated based on at least one of the load's pattern of power consumption, the generator's power production capacity, and the amount of power stored in the ESS.

The ship may further include an exclusive ESS connected to the load and exclusively used for the load.

The power cost may include a value that varies in real time, a value that is updated periodically at intervals of a predetermined amount of time, or a value that is generated when a predetermined event occurs.

Each of the generator, the ESS, and the load may include a signal processor that interprets the power cost and thus determines whether to operate.

According to another aspect of the present invention, a ship includes: a power grid to which a generator, an ESS, and a load are connected; a power cost generator determining power cost; and a signal processor installed in at least one of the generator, the ESS, and the load, the signal processor interpreting the power cost and thus determining whether to operate, wherein the signal processor an interpreter which interprets the power cost and provides the result of the interpretation, a response time controller which stores response delay criteria, receives the result of the interpretation, and controls a time to operate according to the response delay criteria, and a driving command generator which generates a driving command according to the controlled time to operate.

The power cost may be calculated based on at least one of the load's pattern of power consumption, the generator's power production capacity, and the amount of power stored in the ESS.

The ship may further include: a first generator for which a first response delay criterion is set; and a second generator for which a second response delay criterion is set, wherein the first and second generators receive and interpret the power cost and the first generator starts producing power earlier than the second generator.

The first and second generators may receive and interpret the same power cost or may receive and interpret different power costs.

The ship may further include a first load for which a third response delay criterion is set; and a second load for which a fourth response delay criterion, which is different from the third response delay criterion, is set, wherein the first and second loads receive and interpret the power cost and the first load starts consuming power earlier than the second load.

The first and second loads may receive and interpret the same power cost or may receive and interpret different power costs.

The ship may further include: a first ESS for which a fifth response delay criterion is set; and a second ESS for which a sixth response delay criterion, which is different from the fifth response delay criterion, is set, wherein the first and second ESSs receive and interpret the power cost and the first ESS starts supplying power earlier than the second ESS.

The first and second ESSs may receive and interpret the same power cost or may receive and interpret different power costs.

The generator, the ESS, and the load may interpret the power cost and may thus determine whether to operate so as to prevent a rapid change in the power cost.

The power cost generator may include a collector, which collects electrical power environment information from the generator, the ESS, and the load, a predictor, which predicts a change in the environment in the future based on current electrical power environment information collected by the collector, and a determiner, which determines the power cost based on the collected electrical power environment information and the result of the prediction.

Other features and exemplary embodiments may be apparent from the following detailed description, the drawings, and the claims.

DESCRIPTION OF THE DRAWINGS

FIGS. 11 and 12 are diagrams illustrating exemplary ships according to some exemplary embodiments of the present invention.

DETAILED DESCRIPTION

Modes for Carrying Out the Invention

Figure 1:
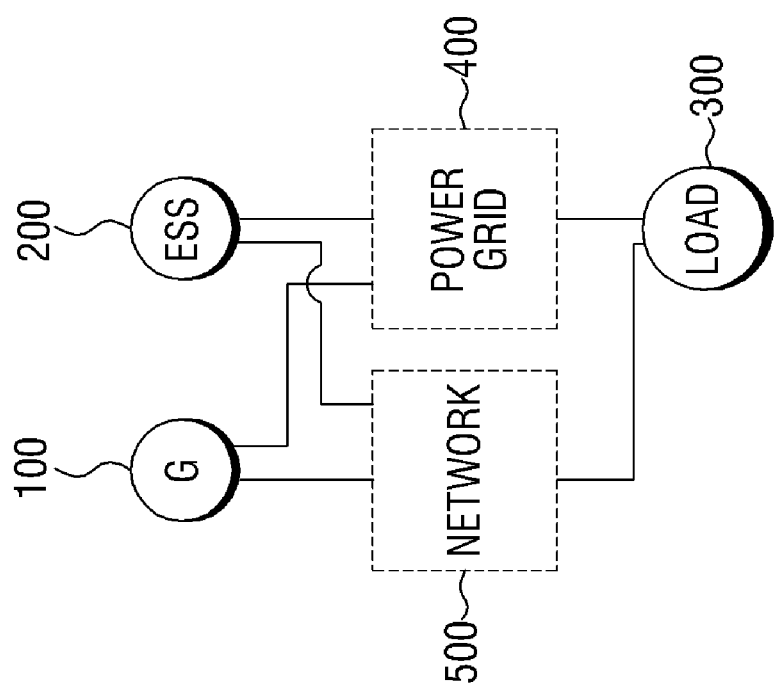
FIG. 1 is a conceptual diagram illustrating a power system installed in a ship according to some exemplary embodiments of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the present invention to those skilled in the art, and the present invention will only be defined within the scope of the appended claims. In the accompanying drawings, like reference numerals indicate like elements.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a conceptual diagram illustrating a power system installed in a ship according to some exemplary embodiments of the present invention.

Referring to FIG. 1, the power system includes a generator 100, an energy storage system (ESS) 200, a load 300, a power grid 400, and a network 500.

The power grid 400 may be in various forms and may be, for example, an AC grid, a DC grid, or a hybrid grid. Power produced by the generator 100 may be stored in the ESS 200, or consumed by the load 300, via the power grid 400. The power stored in the ESS 200 may be delivered to, and consumed by, the load 300 via the power grid 400.

Also, the generator 100, the ESS 200, and the load 300 may be connected to one another via the network 500.

In the ship according to some exemplary embodiments of the present invention, power cost PC may be transmitted to at least one of the generator 100, the ESS 200, and the load 300 via the network 500. Each of the generator 100, the ESS 200, and the load 300 may receive the power cost PC and may determine whether to interpret, and operate based on, the power cost PC.

The power cost PC may be a value that varies in real time or may be a value that is updated periodically at intervals of a predetermined amount of time. Alternatively, the power cost PC may be a value that is generated when a predetermined event occurs.

The network 500 may be a separate element from the power grid 400 or may be incorporated with the power grid 400.

The network 500 may be wired or wireless and may be, for example, a wireless network environment, such as WiBro, Ultra Wide Band (UWB), WiFi, Bluetooth, or ZigBee, or a wired network environment providing various services, such as Transmission Control Protocol (TCP)/Internet Protocol (IP) and HyperText Transfer Protocol (HTTP) residing in the upper layer of TCP/IP, Telnet, File Transfer Protocol (FTP), Domain Name System (DNS), Simple Main Transfer Protocol (SMTP), Simple Network Management Protocol (SNMP), Network File Service (NFS), or Network Information Service (NIS).

The load 300 may be a device/equipment operating in the ship using power. For example, the load 300 may be, but is not limited to, a control system, a home appliance, a motor, or a lighting.

Unlike what is shown in FIG. 1, more than one generator 100, more than one ESS 200, and more than one load 300 may be provided.

Figure 2:
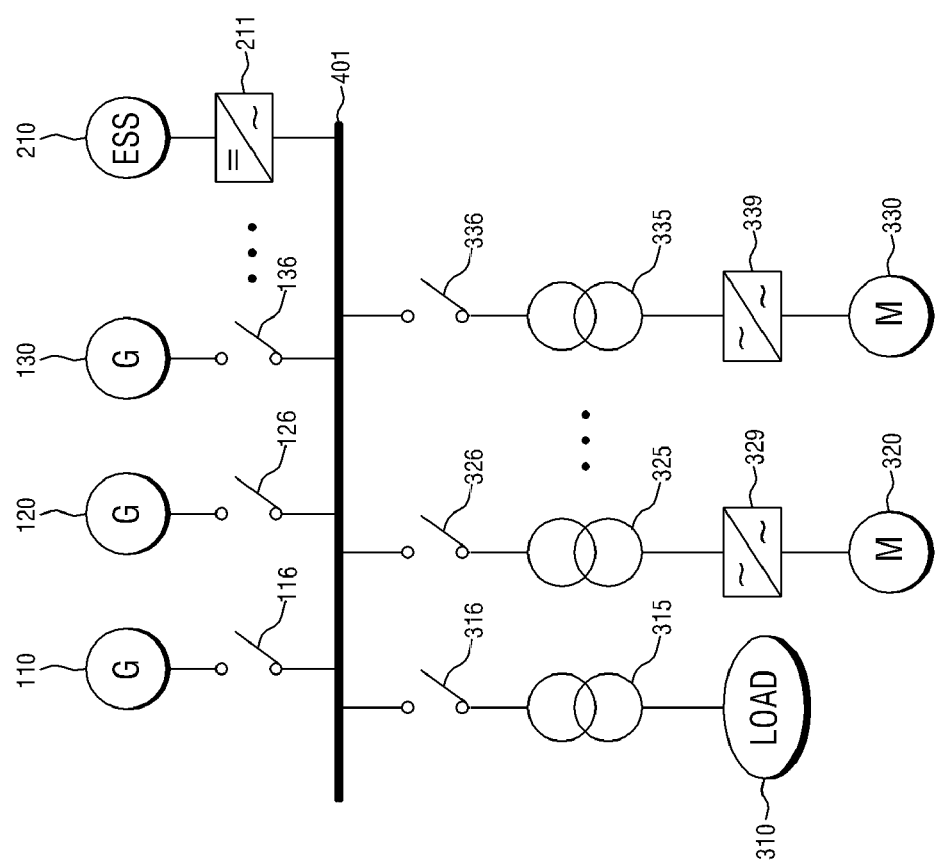
FIG. 2 is a diagram illustrating an exemplary case where a power grid illustrated in FIG. 1 is an AC grid.

FIG. 2 is a diagram illustrating an exemplary case where the power grid illustrated in FIG. 1 is an AC grid.

Referring to FIG. 2, a plurality of generators 110, 120, and 130 are all connected to an AC grid 401 via a plurality of switches 116, 126, and 136. The switches 116, 126, and 136 are selectively turned on and transmit AC power produced by the respective generators 110, 120, and 130 to the AC grid 401.

The generators 110, 120, and 130 may be, but are not limited to, diesel generators capable of producing, for example, 200 KW or more of power. The generators 110, 120, and 130 may generate AC power having a predetermined voltage and a predetermined frequency through self-regulation. For example, the predetermined voltage and the predetermined frequency may be 440 V and 60 Hz, respectively.

At least one ESS 210 is connected to the AC grid 401 via a converter 211. The converter 211 may be a DC-to-AC converter.

A plurality of loads 310, 320, and 330 are connected to the AC grid 401 via a plurality of transformers 315, 325, and 335, respectively, and a plurality of switches 316, 326, and 336, respectively. As illustrated in FIG. 2, converters 329 and 339 may be disposed between the loads 320 and 330 and the transformers 325 and 335. The converters 329 and 339 may be AC-to-AC converters.

Figure 3:
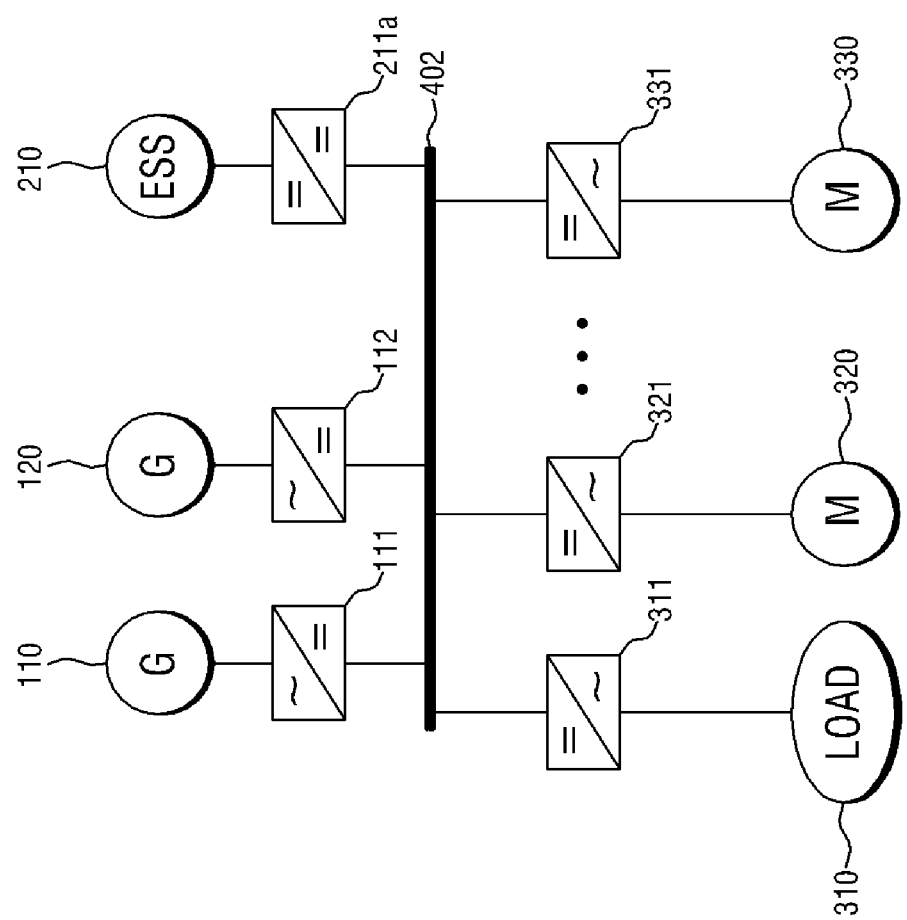
FIG. 3 is a diagram illustrating an exemplary case where the power grid illustrated in FIG. 1 is a DC grid.

FIG. 3 is a diagram illustrating an exemplary case where the power grid illustrated in FIG. 1 is a DC grid.

Referring to FIG. 3, a plurality of generators 110 and 120 are connected to a DC grid 402 via a plurality of converters 111 and 112, respectively. The converters 111 and 112 may be AC-to-DC converters.

At least one ESS 210 is connected to the DC grid 402 via a converter 211a. The converter 211a may be a DC-to-DC converter.

A plurality of loads 310, 320, and 330 are connected to the DC grid 402 via a plurality of converters 311, 321, and 331, respectively. Since the loads 310, 320, and 330, which are AC loads, are connected to the DC grid 402, the converters 311, 321, and 331 may all be DC-to-AC converters.

Figure 4:
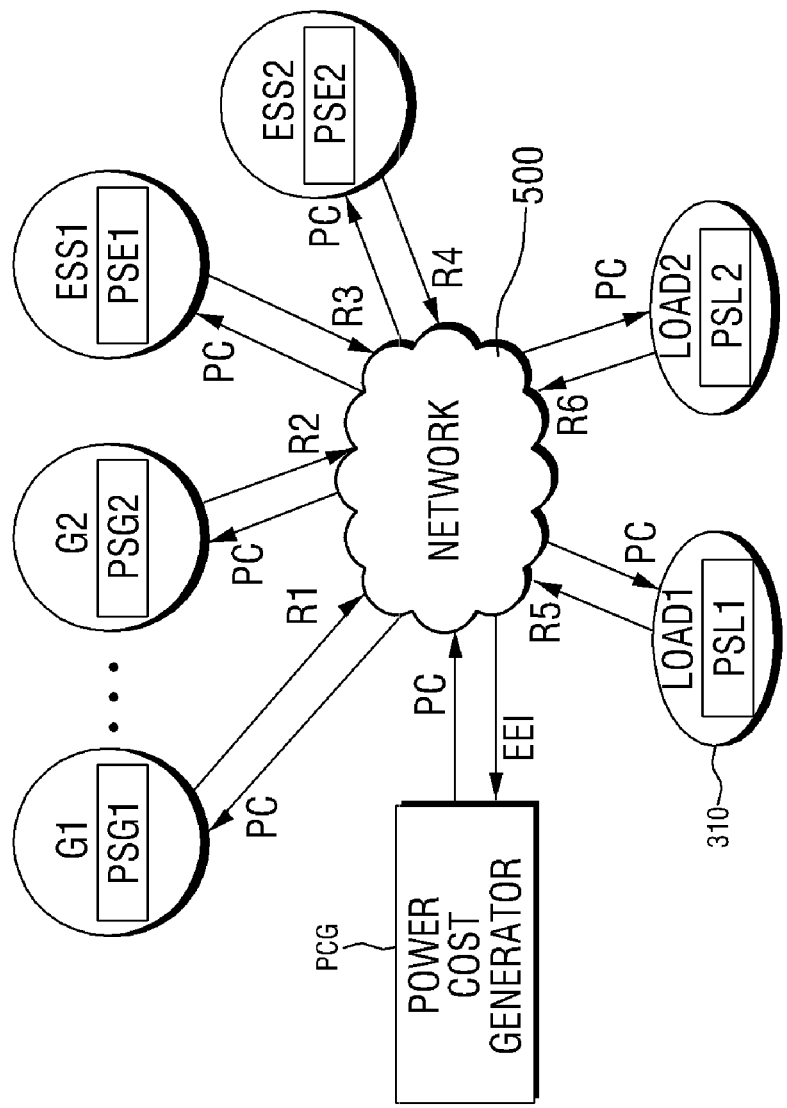
FIG. 4 is a detailed diagram of the power system illustrated in FIG. 1.

FIG. 4 is a detailed diagram of the power system illustrated in FIG. 1.

Referring to FIG. 4, a power cost generator PCG calculates/determines power cost PC and provides the power cost PC to the network 500.

As described above, one or more generators G1 and G2, one or more ESSs ESS1 and ESS2, and one or more loads LOAD1 and LOAD2 are connected to one another via the network 500. The generators G1 and G2, the ESSs ESS1 and ESS2, and the loads LOAD1 and LOAD2 receive the power cost PC via the network 500.

Specifically, the generators G1 and G2 may interpret the power cost PC and may determine whether to produce power. To this end, the generators G1 and G2 may include signal processors PSG1 and PSG2, respectively. The generators G1 and G2 may provide state signals R1 and R2, respectively, indicating current state information, whether, when, and to what capacity to produce power to the network 500.

The ESSs ESS1 and ESS2 may interpret the power cost PC and may determine whether to store power. To this end, the ESSs ESS1 and ESS2 may include signal processors PSE1 and PSE2, respectively. The ESSs ESS1 and ESS2 may provide state signals R3 and R4, respectively, indicating current state information, the amount of power stored, the time of storage of power, the time of consumption of power to the network 500.

The loads LOAD1 and LOAD2 may interpret the power cost PC and may determine whether to use power. To this end, the loads LOAD1 and LOAD2 may include signal processors PSL1 and PSL2, respectively. The loads LOAD1 and LOAD2 may provide state signals R5 and R6, respectively, indicating current state information, the amount of power consumed by each load, the time of consumption of power by each load, and each load's pattern of power consumption to the network 500.

The power cost generator PCG collects electrical power environment information EEI including the state signals R1 through R6 and calculates the power cost PC. For example, the power cost generator PCG may calculate the power cost PC by referencing at least one of each load's pattern of power consumption, each generator's power production capacity, and the amount of power stored in each ESS, but the present invention is not limited thereto.

Figure 5:
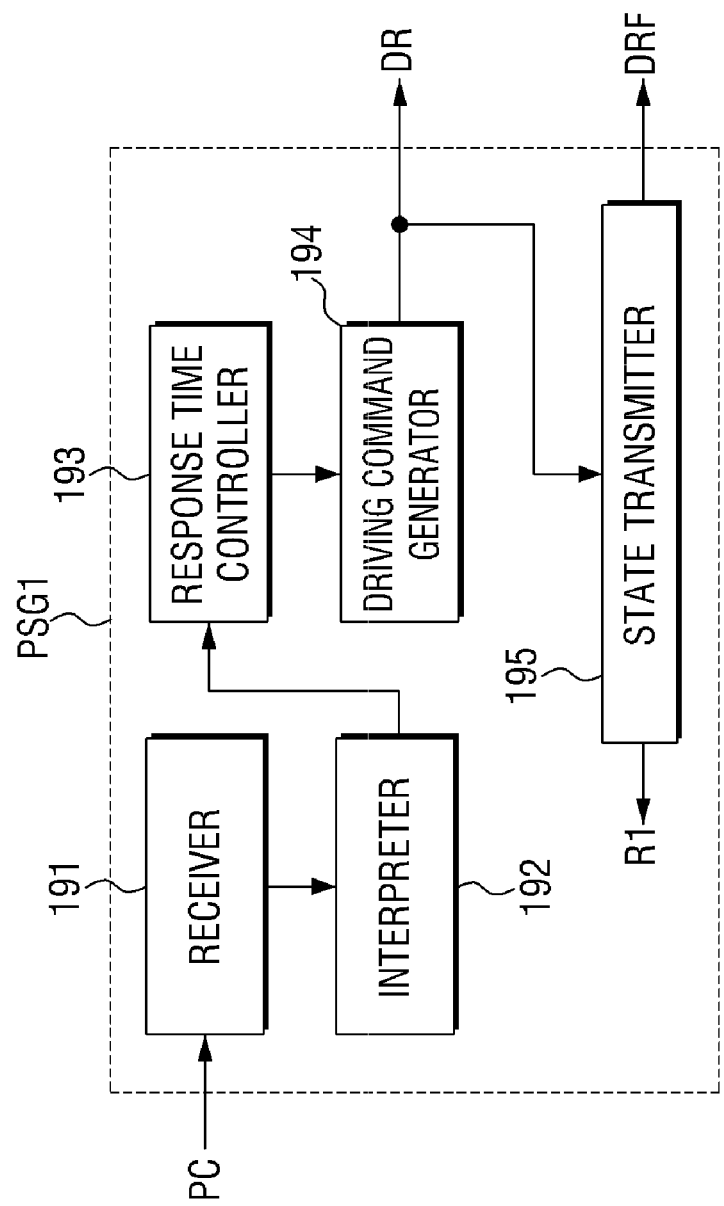
FIG. 5 is a detailed diagram of a signal processor illustrated in FIG. 4.
Figure 6:
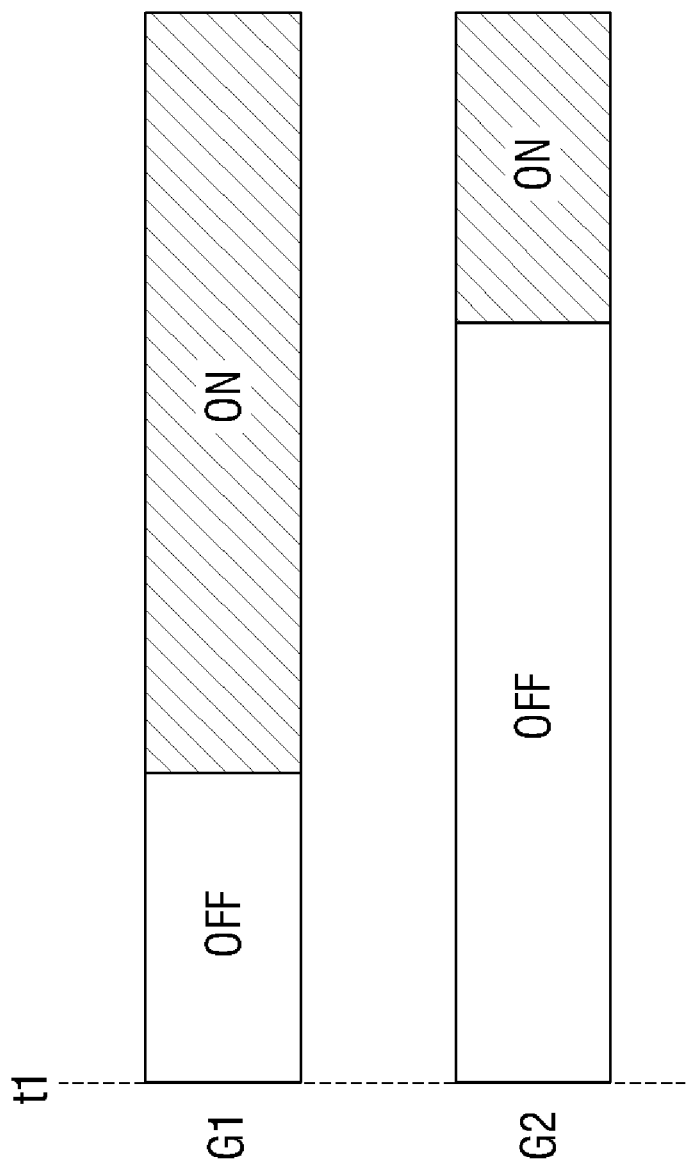
FIGS. 6 through 8 are diagrams illustrating operations associated with signal processors.
Figure 7:
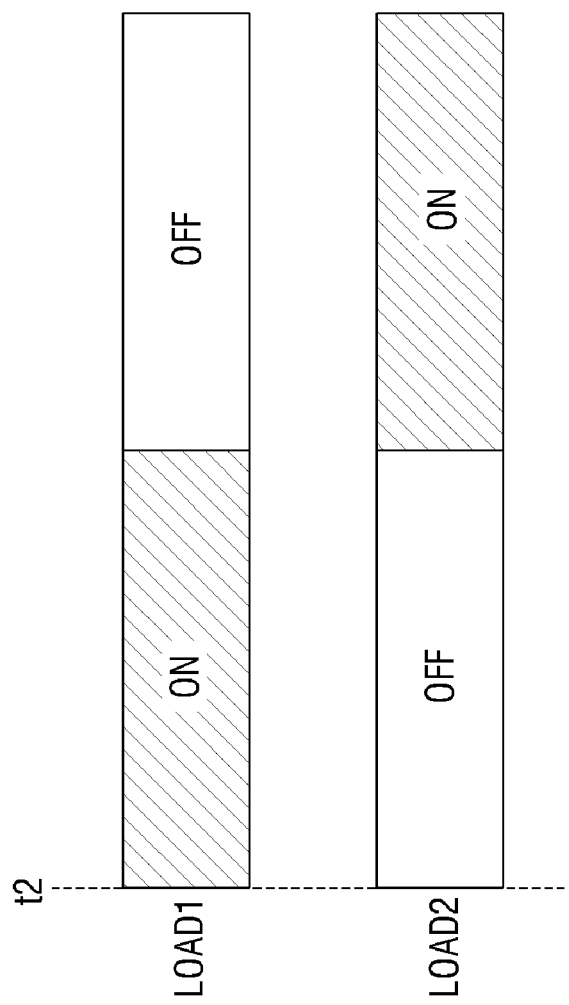
Figure 8:
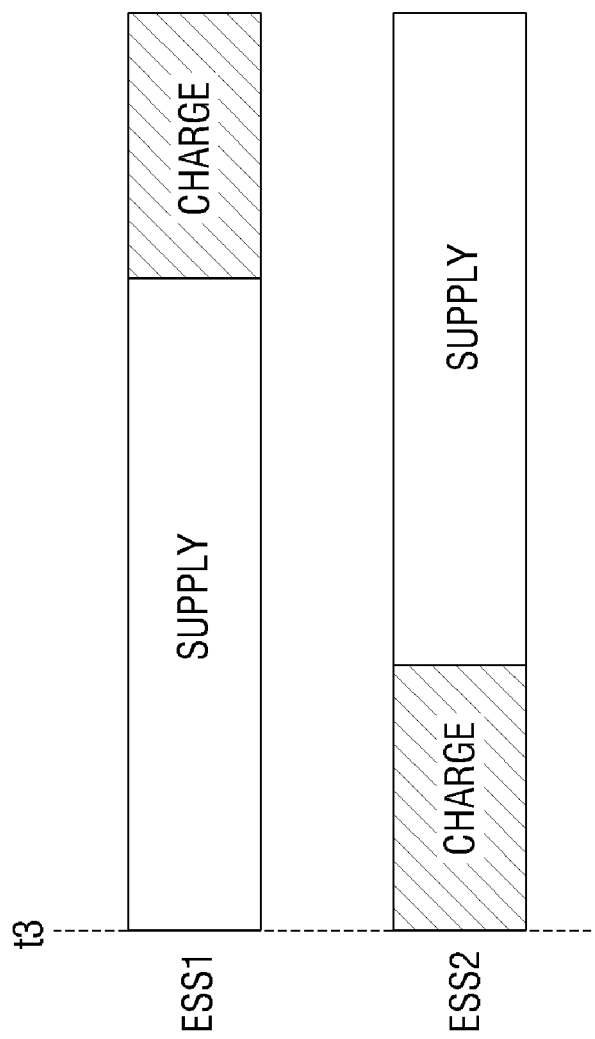

FIG. 5 is a detailed diagram of a signal processor illustrated in FIG. 4. FIGS. 6 through 8 are diagrams illustrating operations associated with signal processors.

Referring to FIG. 5, the signal processor PSG1 may include a receiver 191, an interpreter 192, a response time controller 193, a driving command generator 193, and a state transmitter 195.

The receiver 191 receives power cost PC via the network 500 and transmits the power cost PC to the interpreter 192.

The interpreter 192 interprets the power cost PC transmitted by the receiver 191 and transmits the result of the interpretation to the response time controller 193.

The response time controller 193 stores a response delay criterion. Also, the response time controller 193 receives the result of the interpretation performed by the interpreter 192 and controls the time to operate according to the response delay criterion.

The driving command generator 194 generates a driving command DR according to the controlled time to operate.

The generator G1 may start operating according to the driving command DR. The generator G1 may transmit a feedback signal DRF to the signal processor PSG1 (i.e., to the state transmitter 195).

The state transmitter 195 may receive the driving command DR and the feedback signal DRF and may output the state signal R1, which describes the operating state of the generator G1.

FIG. 5 illustrates the signal processor PSG1 installed in the generator G1 as an exemplary signal processor, but the signal processor PSG2 installed in the generator G2, the signal processors PSE1 and PSE2 installed in the ESSs ESS1 and ESS2, and the signal processors PSL1 and PSL2 installed in the loads LOAD1 and LOAD2 may all be substantially the same as the signal processor PSG1.

Operations associated with signal processors will hereinafter be described with reference to FIGS. 6 through 8.

Referring to FIGS. 4 and 6, for example, a first response delay criterion may be set in the signal processor PSG1 of the first generator G1, and a second response delay criterion may be set in the signal processor PSG2 of the second generator G2.

The first and second generators G1 and G2 may receive the same power cost PC via the network 500 and may interpret the received power cost.

However, since the first and second response delay criteria differ from each other, the first generator G1 may start producing power at a different time from the second generator G2. For example, as illustrated in FIG. 6, the first and second generators G1 and G2 receive the power cost PC at a time t1, and the first generator G1 may start producing power earlier than the second generator G2.

If the power cost PC changes before the second generator G2 starts producing power, the second generator G2 may not even start producing power.

That is, the first and second generators G1 and G2 may have different operating properties. In other words, the first and second generators G1 and G2 may be for different purposes of use. The first generator G1 may be set to quickly respond to a change in the power cost PC, and the second generator G2 may be set to slowly respond to a change in the power cost PC. Alternatively, the first generator G1 may readily produce a small amount of power, and the second generator G2 may produce a large amount of power, but at high cost. In this manner, a rapid drop in the power cost PC can be prevented by allowing multiple generators, i.e., the generators G1 and G2, to produce power at the same time in accordance with a change in the power cost PC.

Referring to FIGS. 4 and 7, for example, a third response delay criterion may be set for the signal processor PSL1 of the first load LOAD1, and a fourth response delay criterion, which is different from the third response delay criterion, may be set for the signal processor PSL2 of the second load LOAD2.

The first and second loads LOAD1 and LOAD2 may receive the same power cost PC via the network 500 and may interpret the received power cost.

However, since the third and fourth response delay criteria are different, the first load LOAD1 may start consuming power at a different time from the second load LOAD2. For example, as illustrated in FIG. 7, the first and second loads LOAD1 and LOAD2 may receive the power cost PC at a time t2, and the first load LOAD1 may start consuming power earlier than the second load LOAD2.

If the power cost PC changes before the second load LOAD2 starts consuming power, the second load LOAD2 may not even start consuming power.

Also, if the second load LOAD2 is, for example, a motor installed at a particular location, the second load LOAD2 may not operate at all when the power cost PC is high and may slowly respond and start operating only when the power cost PC is reduced to or below a predetermined value.

That is, the first and second loads LOAD1 and LOAD2 may have different operating properties. The first load LOAD1 may be set to readily respond to a change in the power cost PC, and the second load LOAD2 may be set to slowly respond to a change in the power cost PC. In this manner, it is possible to prevent a rapid increase in the power cost PC that may be caused by letting multiple loads start consuming power at the same time according to a change in the power cost PC.

Referring to FIGS. 4 and 8, for example, a fifth response delay criterion may be set for the signal processor PSE1 of the first ESS ESS1, and a sixth response delay criterion, which is different from the fifth response delay criterion, may be set for the signal processor PSE2 of the second ESS ESS2.

The first and second ESSs ESS1 and ESS2 may receive the same power cost PC via the network 500 and may interpret the received power cost.

However, since the fifth and sixth response delay criteria are different, the first ESS ESS1 may start supplying or storing power at a different time from the second load LOAD2. For example, as illustrated in FIG. 8, the first and second ESSs ESS1 and ESS2 may receive the power cost PC at a time t3, and the first ESS ESS1 may start consuming power earlier than the second ESS ESS2.

If the power cost PC changes before the second ESS ESS2 starts supplying power, the second ESS ESS2 may not even start consuming power.

That is, the first and second ESSs ESS1 and ESS2 may have different operating properties. The first ESS ESS1 may be set to readily respond to a change in the power cost PC, and the second ESS ESS2 may be set to slowly respond to a change in the power cost PC. In this manner, it is possible to prevent a rapid increase in the power cost PC that may be caused by letting multiple ESSs start supplying power at the same time according to a change in the power cost PC.

Figure 9:
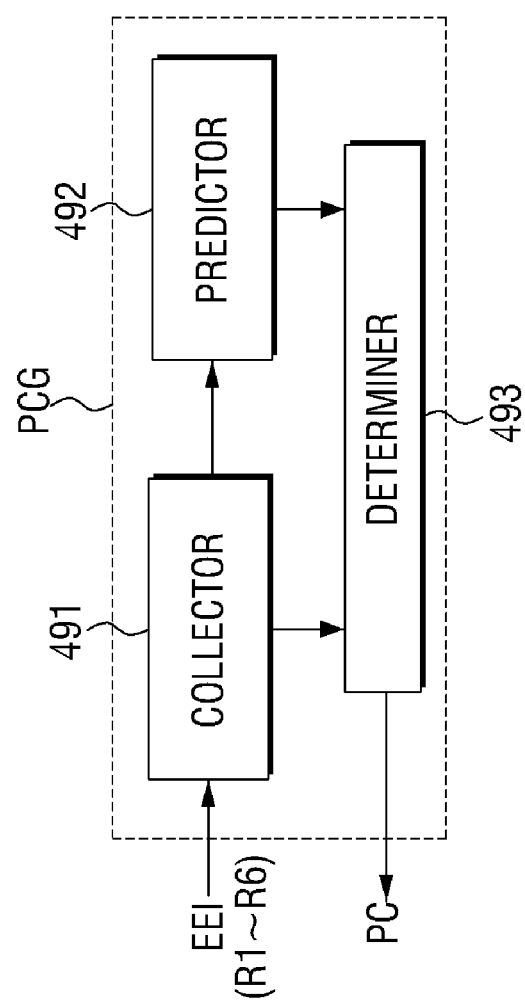
FIG. 9 is a detailed diagram of a power cost generator illustrated in FIG. 4.

FIG. 9 is a detailed diagram of the power cost generator illustrated in FIG. 4.

Referring to FIG. 9, the power cost generator PCG collects the electrical power environment information EEI including the state signals R1 through R6 and calculates the power cost PC. The power cost generator PCG may monitor the state (for example, the current, frequency, voltage, and the like) of an entire power grid by collecting the electrical power environment information EEI. Specifically, the power cost generator PCG may calculate power cost based on at least one of each load's pattern of power consumption, each generator's power production capacity, and the amount of power stored in each ESS, but the present disclosure is not limited thereto.

The power cost generator PCG may include a collector 491, a predictor 492, and a determiner 493.

The collector 491 collects the electrical power environment information EEI including the state signals R1 through R6.

The predictor 492 predicts a change in the environment in the future based on current electrical power environment information EEI. That is, the predictor 492 may predict whether the power cost PC will rapidly increase or decrease and how much the power cost PC will increase or decrease.

The determiner 493 receives the electrical power environment information EEI from the collector 491 and prediction information from the predictor 492 and determines the power cost PC.

Figure 10:
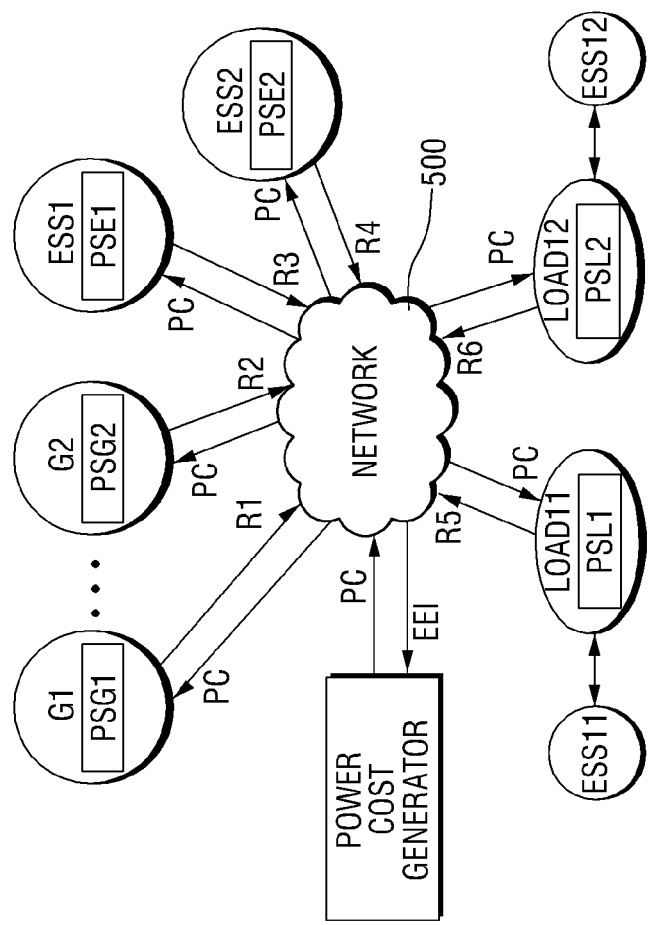
FIG. 10 is a detailed diagram of the power system illustrated in FIG. 1.

FIG. 10 is a detailed diagram of the power system illustrated in FIG. 1. For convenience, the power system of FIG. 10 will hereinafter be described, focusing mainly on differences with the power system of FIG. 4.

Referring to FIG. 10, loads LOAD11 and LOAD12 may include exclusive ESSs ESS11 and ESS12, respectively. That is, the exclusive ESS ESS11 may be exclusively for the load LOAD11, and the exclusive ESS ESS12 may be exclusively for the load LOAD12.

For example, when the power cost PC is low, the load LOAD11 may consume power stored in the exclusive ESS ESS11. When the power cost PC is low but the loads LOAD11 and LOAD12 do not need to operate, the exclusive ESS ESS11 may store power.

Figure 11:
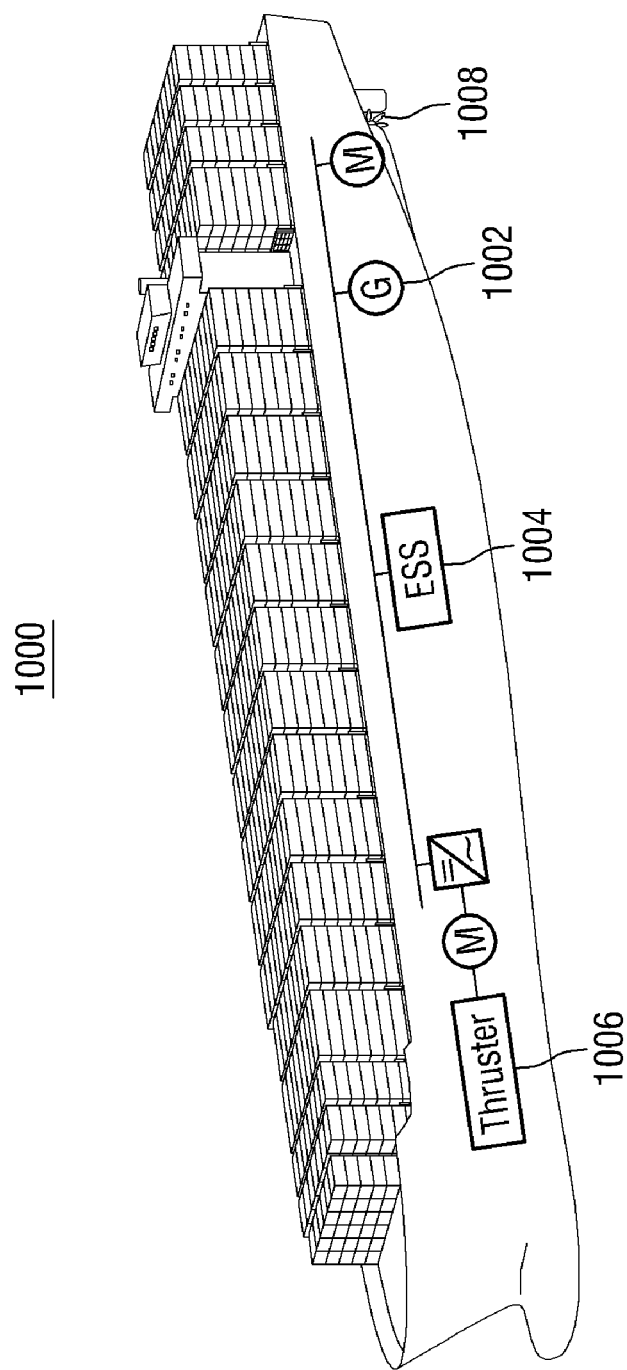

FIGS. 11 and 12 are diagrams illustrating exemplary ships according to some exemplary embodiments of the present invention.

Referring to FIG. 11, the power system according to the present invention may be applied to a container ship 1000. Specifically, the elements of the power system according to the present invention may be applied to a thruster 1006 located at the bow, an ESS 1004 located near the middle of the hull, and a generator 1002 and a propeller 1008 located at the stern. Alternatively, the ESS 1004 may be disposed on a container placed on the deck.

Referring to FIG. 12, the power system according to the present invention may be applied to an LNG carrier 2000. Specifically, the elements of the power system according to the present invention may be applied to a thruster 2006 located at the bow, an ESS 2004 located near the middle of the hull, and a generator 2002 and a propeller 2008 located at the stern. Power produced by the generator 2002 and power released from the ESS 2004 may be supplied to loads such as a temperature regulator for regulating the temperature of an LNG tank or a compressor for re-liquefying a boil off gas (BOG) vaporized in the LNG tank.

The power system according to the present invention can be applied to various ships producing power and supplying the produced power to loads, such as the container ship 1000 and the LNG carrier 2000. FIGS. 11 and 12 simply illustrate that the power system according to the present invention can be applied to various ships, and the configuration of the power system according to the present invention can be designed and modified in various manners.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further exemplary embodiments of the present invention.

It is claimed:

1. A ship comprising:
a power grid;
a power cost generator determining a power cost, wherein the power cost includes at least one of a first value that varies in real time, a second value that is updated periodically at intervals of a predetermined amount of time, or a third value that is generated when a predetermined event occurs;
a generator connected to the power grid, the generator interpreting the power cost and thus determining whether to produce power based on the power cost;
an energy storage system (ESS) connected to the power grid, the ESS interpreting the power cost and thus determining whether to store power based on the power cost; and
a load connected to the power grid, the load interpreting the power cost and thus determining whether to use power based on the power cost,
wherein the generator, the ESS and the load are connected to one another via a network.

2. The ship of claim 1, wherein the power cost is calculated based on at least one of the load's pattern of power consumption, the generator's power production capacity, and the amount of power stored in the ESS.

3. The ship of claim 1, further comprising:
an exclusive ESS connected to the load and exclusively used for the load.

4. The ship of claim 1, wherein each of the generator, the ESS, and the load includes a signal processor that interprets the power cost and thus determines whether to operate based on the power cost.

5. The ship of claim 4, wherein the generator, the ESS, and the load interpret the power cost and thus determine whether to operate so as to prevent a rapid change in the power cost.

6. A ship comprising:
a power grid to which a generator, an energy storage system (ESS), and a load are connected;
a power cost generator determining a power cost, wherein the power cost includes at least one of a first value that varies in real time, a second value that is updated periodically at intervals of a predetermined amount of time, or a third value that is generated when a predetermined event occurs; and
a signal processor installed in each of the generator, the ESS, and the load, the signal processor interpreting the power cost and thus determining whether to operate based on the power cost,
wherein the signal processor comprises an interpreter which interprets the power cost and provides the result of the interpretation, a response time controller which stores response delay criteria, receives the result of the interpretation, and controls a time to operate according to the response delay criteria, and a driving command generator which generates a driving command according to the controlled time to operate, and
wherein the generator, the ESS and the load are connected to one another via a network.

7. The ship of claim 6, wherein the power cost is calculated based on at least one of the load's pattern of power consumption, the generator's power production capacity, and the amount of power stored in the ESS.

8. The ship of claim 6, further comprising:
a first generator for which a first response delay criterion is set; and
a second generator for which a second response delay criterion is set,
wherein
the first and second generators receive and interpret the power cost, and
the first generator starts producing power earlier than the second generator.

9. The ship of claim 8, wherein the first and second generators receive and interpret the same power cost or receive and interpret different power costs.

10. The ship of claim 6, further comprising:
a first load for which a third response delay criterion is set; and
a second load for which a fourth response delay criterion, which is different from the third response delay criterion, is set,
wherein
the first and second loads receive and interpret the power cost, and
the first load starts consuming power earlier than the second load.

11. The ship of claim 10, wherein the first and second loads receive and interpret the same power cost or receive and interpret different power costs.

12. The ship of claim 6, further comprising:
a first ESS for which a fifth response delay criterion is set; and
a second ESS for which a sixth response delay criterion, which is different from the fifth response delay criterion, is set,
wherein
the first and second ESSs receive and interpret the power cost, and
the first ESS starts supplying power earlier than the second ESS.

13. The ship of claim 12, wherein the first and second ESSs receive and interpret the same power cost or receive and interpret different power costs.

14. The ship of claim 6, wherein the power cost generator includes a collector, which collects electrical power environment information from the generator, the ESS, and the load, a predictor, which predicts a change in the environment in the future based on current electrical power environment information collected by the collector, and a determiner, which determines the power cost based on the collected electrical power environment information and the result of the prediction.

* * * * *